US006517659B1

(12) United States Patent
VanderWerf et al.

(10) Patent No.: US 6,517,659 B1
(45) Date of Patent: Feb. 11, 2003

(54) METHOD FOR COINCIDENTALLY CUT AND FUSED OBJECT

(75) Inventors: Dale Allen VanderWerf, Chandler, AZ (US); Todd Merl Elder, Casa Grande, AZ (US)

(73) Assignee: Active Mfg. Corp., Tempe, AZ (US)

( * ) Notice: Subject to any disclaimer, the term of this patent is extended or adjusted under 35 U.S.C. 154(b) by 0 days.

(21) Appl. No.: 09/442,921

(22) Filed: Nov. 18, 1999

(51) Int. Cl.[7] .............................................. B32B 31/00
(52) U.S. Cl. ....................... 156/251; 156/515; 156/269; 156/290; 156/308.4; 156/272.8; 219/121.72
(58) Field of Search .............................. 156/251, 272.8, 156/515, 267, 269, 290, 308.4; 2/161.7, 159, 69, 160, 161.1–8, 162–169; 219/121.72

(56) References Cited

U.S. PATENT DOCUMENTS

| | | | | |
|---|---|---|---|---|
| 4,034,853 A | * | 7/1977 | Smith | 206/278 |
| 4,500,382 A | * | 2/1985 | Foster | 156/272.8 |
| 4,742,578 A | | 5/1988 | Seid | 2/2.5 |
| 4,864,661 A | | 9/1989 | Gimbel | 2/167 |
| 4,901,372 A | | 2/1990 | Pierce | 2/167 |
| 4,995,119 A | | 2/1991 | Codkind | 2/163 |
| 5,070,543 A | | 12/1991 | Beck | 2/163 |
| 5,250,784 A | * | 10/1993 | Muller et al. | 219/121.72 |
| 5,259,069 A | | 11/1993 | Gimbel | 2/163 |
| 5,368,930 A | * | 11/1994 | Samples | 428/323 |
| 5,423,090 A | | 6/1995 | Gimbel | 2/161.7 |
| 5,692,935 A | * | 12/1997 | Smith | 442/38 |
| 6,103,050 A | * | 8/2000 | Kureger | 156/251 |

* cited by examiner

Primary Examiner—Linda Gray
(74) Attorney, Agent, or Firm—Lowell W. Gresham; Jordan M. Meschkow; Charlene R. Jacobsen

(57) ABSTRACT

A method (100) of constructing a flexible object (20) formed of a plurality of mutually conjoined layers (22) is disclosed. A first outer layer (28), four intermediate layers (36), and a second outer layer (38) of substantially a fusible polyester sheet material woven of microfibers are obtained (110,124, 130). The first outer layer (28) is positioned (144) over a work surface (24), the four intermediate layers (36) are positioned (148) over the first outer layer (28), and the second outer layer (38) is positioned (150) over the first outer layer (28) and intermediate layers (36). A laser cutting head (26) is configured (158) to be fusional for all of layers (28,36,38). A periphery (50) of the object (20) is then cut (164) through each of the layers (22) by substantially simultaneously moving the laser cutting head (26) relative to the layers (22), and coincidentally fusing (166) the peripheries (50) to form the object (20).

10 Claims, 3 Drawing Sheets

METHOD FOR COINCIDENTALLY CUT AND FUSED OBJECT

TECHNICAL FIELD OF THE INVENTION

The present invention relates to the field of layered objects. More specifically, the present invention relates to cut and peripherally fused layered objects.

BACKGROUND OF THE INVENTION

Flexible layered objects may be used in various fields to provide padding, increased strength, and/or puncture resistance to other devices of which the objects are a part. For, example, flexible layered objects have been used extensively as insulative padding for clothing, blankets, quilts and the like. Similarly, flexible layered objects are often used as to produce tow or tie-down straps, webbing, etc. In the medical and investigative fields, flexible layered objects are utilized as puncture-resistant pads within surgical and examination gloves, etc. In all these uses, the flexible layered object provides some combination of insulation, strength, and/or penetration resistance either directly or indirectly applicable to the device of which the object is a part while maintaining flexibility and conformity.

The need for flexibility and conformity may be illustrated with a surgical or examination glove. Members of the medical and other professions often encounter situations where there is a strong need to prevent the transmission of disease, toxins, or other contaminants. The latex surgical or examination glove has proven to be a preferred choice in the establishment of a transmission barrier without impeding the treatment or examination. Unfortunately, the latex glove is fragile and subject to penetration. Medical, fire, police, and other personnel are often placed in circumstances where a penetration of a glove by a needle, debris, or even a broken bone may expose the individual to debilitating or even fatal results.

To inhibit such a penetration of the glove, and a resultant exposure, a double-glove technique is often used where an inner glove is placed over the hand and an outer glove is placed over the inner glove, with barriers placed between the two gloves in critical areas to inhibit penetration. Therefore, if a penetration of the outer glove occurs, the barrier arrests the penetrating object and inhibits penetration of the inner glove, thus maintaining the protective barrier.

The objects used as barriers in the above scenario are typically metallic cots, chain mail, metallic sheets, rubber-covered nylon or polyester pads, rubber cots, nylon or polyester cots, and/or nylon or polyester sheets. Such objects may be held in place by adhesives, by tension between the inner and outer gloves, or as an integral part of either the inner or outer glove. All such objects have individual advantages and disadvantages.

Desirably, an object for use with surgical or examination gloves should exhibit sufficient flexibility to conform to the shape of the proximate portion of the hand. Additionally, the object should be thin enough to allow the transmission of tactile sensation. These characteristics are especially desirable in pads or sheets located proximate the palmar surface of a distal phalange.

Thin, layered polyester pads form objects exhibiting the desired characteristics. When formed of layers woven of twisted microfibers, such objects exhibit considerable penetration resistance while maintaining the desired flexibility and tactile transmission. Because of the binding properties of tightly woven microfiber polyester, such objects are especially resistant to pointed penetrators, such as needles, shrapnel, splinters, etc.

A problem exists, however, in the cutting and bonding of woven microfiber layers. Once cut, the individual layers are difficult to maintain in alignment for bonding. This problem is especially pronounced in smaller objects, such as fingertip pads, as the layers are then both thin and small in area. This leads to bonding-before-cutting processes, with attendant wastage.

Further problems exist in the bonding of such layers. When bonding is accomplished by sewing, a ridge is raised that decreases the overall flexibility. Even if tacking is used to prevent the formation of a continuous ridge, the tacking leaves small bumps. The ridge or bumps interfere with the transference of tactile sensation and produce an uncomfortable fit of the object.

In other applications, a variety of materials, from plastics to metals, are bonded by fusing or welding. However, conventional fusing techniques require a surface administration of the requisite heat. Such a surface administration produces a relatively stiff fusion area. This in turn decreases flexibility and conformity of the object, thus decreasing its usefulness.

SUMMARY OF THE INVENTION

Accordingly, it is an advantage of the present invention that a coincidentally cut and fused object and method is provided.

It is another advantage of the present invention that a method is provided wherein a plurality of layers of a fusible sheet material may be cut and coincidentally fused to form an object.

It is another advantage of the present invention that the cutting and fusing activities provide a flexible periphery for the object.

It is another advantage of the present invention that the fusing activity forms substantially ridgeless junctures between surfaces of the object and a flexible periphery of the object.

It is another advantage of the present invention that an object is formed from a plurality of fusible woven polyester sheets.

It is another advantage of the invention that layers of the object may be substantially identical.

It is another advantage of the invention that a surface of the object may have an adhesive coating.

The above and other advantages of the present invention are carried out in one form by a method of constructing a flexible object formed of a plurality of mutually conjoined layers through the activities of positioning a first layer of a fusible sheet material over a work surface, positioning a second layer of a fusible sheet material over the first layer, cutting a layer periphery of the object through each of the layers by moving the layers relative to a laser cutting head, fusing, coincidentally with the cutting activity, the layer peripheries with the laser cutting head to form an object periphery, and maintaining the layers stationary relative to each other during the coincident cutting and fusing activities.

The above and other advantages of the present invention are carried out in another form by a flexible object having a plurality of mutually conjoined layers, wherein the object incorporates first and second layers each having inner and outer surfaces and coupled so that the inner surfaces face each other, at least one intermediate layer coupled between the first and second layers, and an object periphery formed by substantially simultaneously cutting a layer periphery of each of the layers and coincidentally fusing each of the layer peripheries to each other with a fusional laser cutting head.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
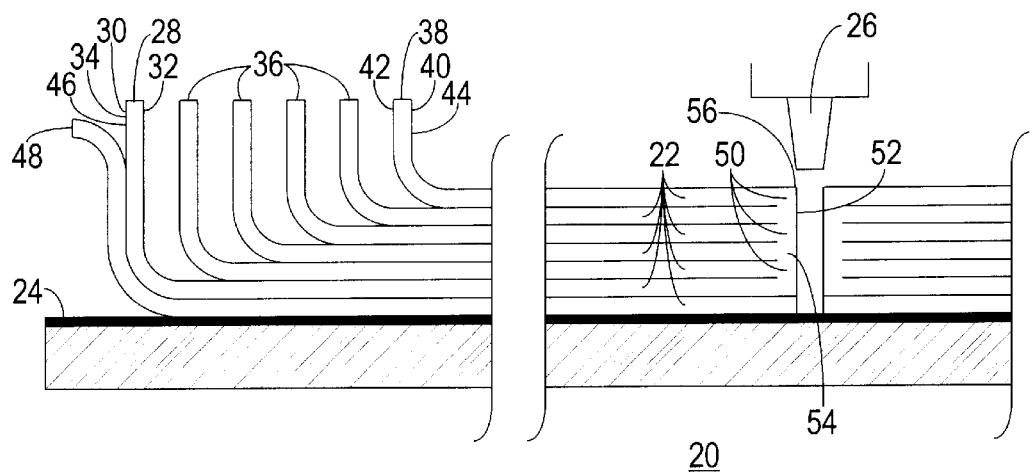
FIG. 1 depicts a cross-sectional view of a portion of a flexible object in accordance with a preferred embodiment of the present invention.
Figure 2:
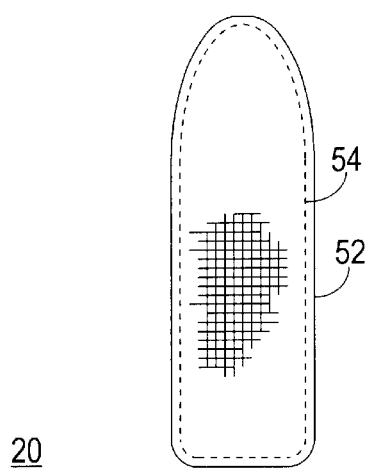
FIG. 2 depicts a plan view of the object of FIG. 1 in accordance with a preferred embodiment of the present invention.
Figure 3:
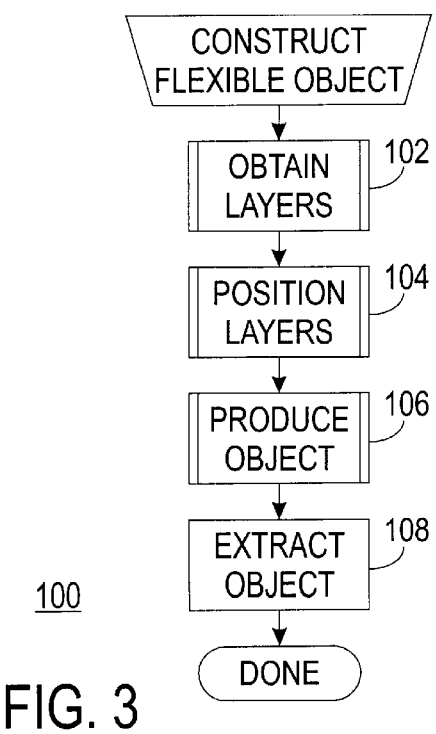
FIG. 3 depicts a flowchart of a process to construct the object of FIG. 1 in accordance with a preferred embodiment of the present invention.
Figure 4:
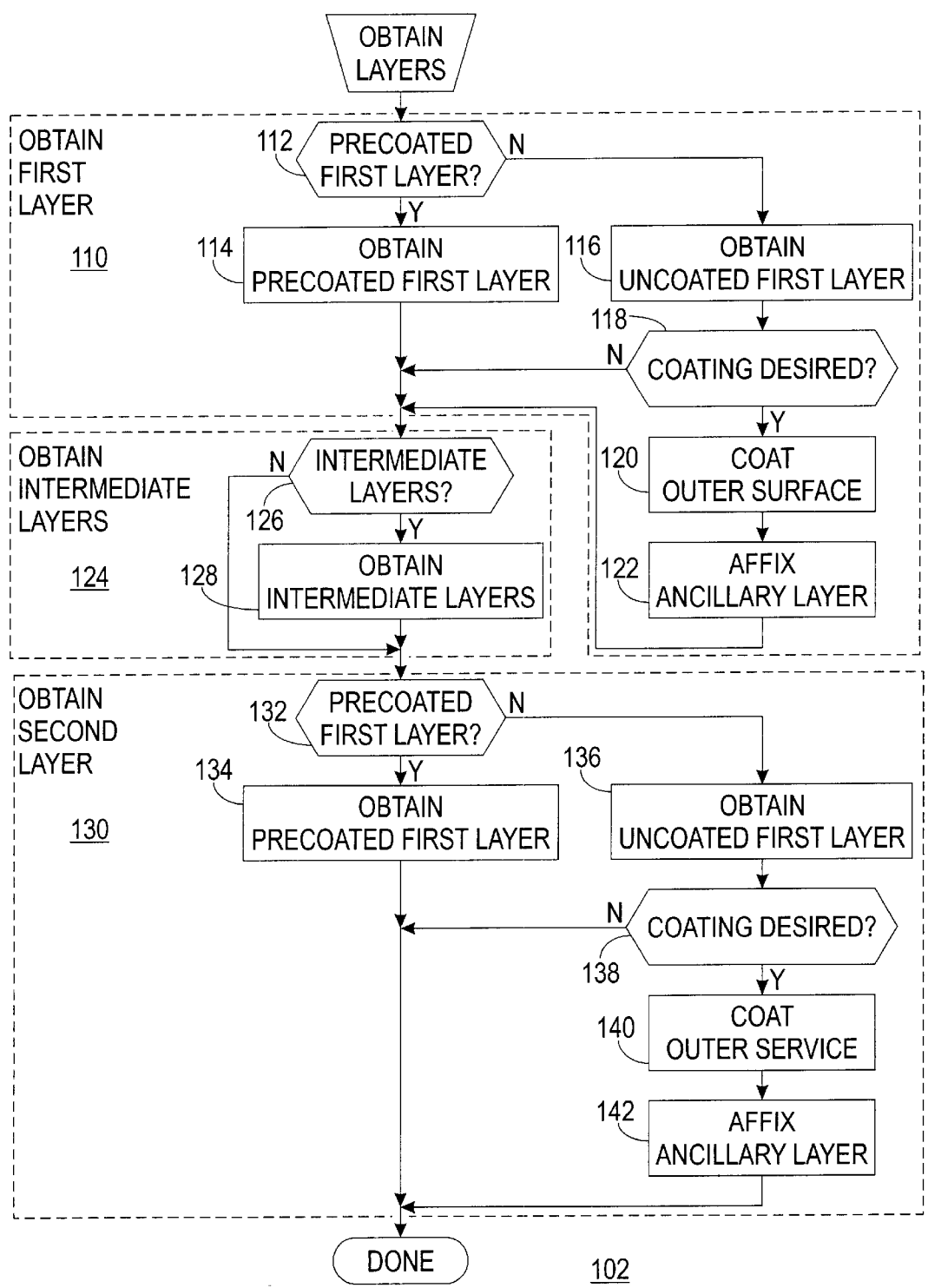
FIG. 4 depicts a flowchart of a subprocess of the process of FIG. 3 to obtain layers of flexible sheet material for the object of FIG. 1 in accordance with a preferred embodiment of the present invention.
Figure 5:
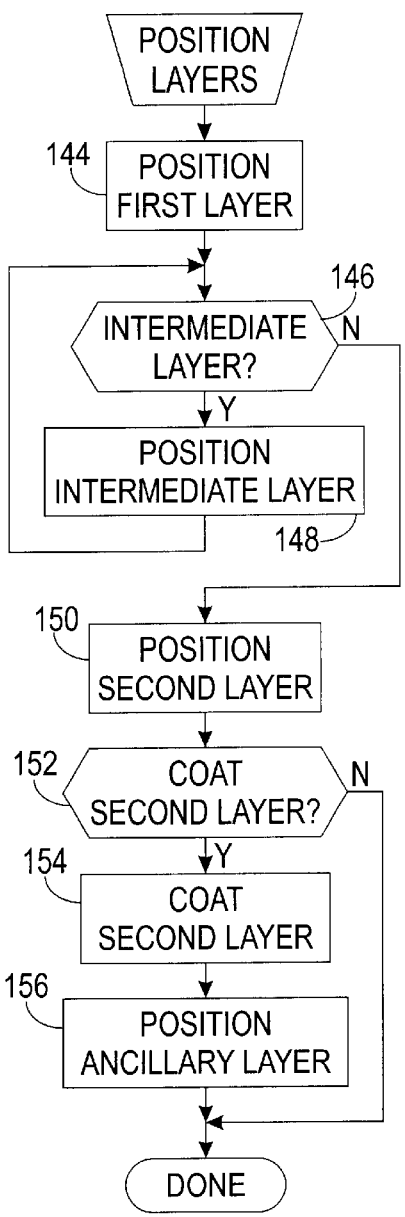
FIG. 5 depicts a flowchart of a subprocess of the process of FIG. 3 to position the layers of flexible sheet material for the object of FIG. 1 in accordance with a preferred embodiment of the present invention.
Figure 6:
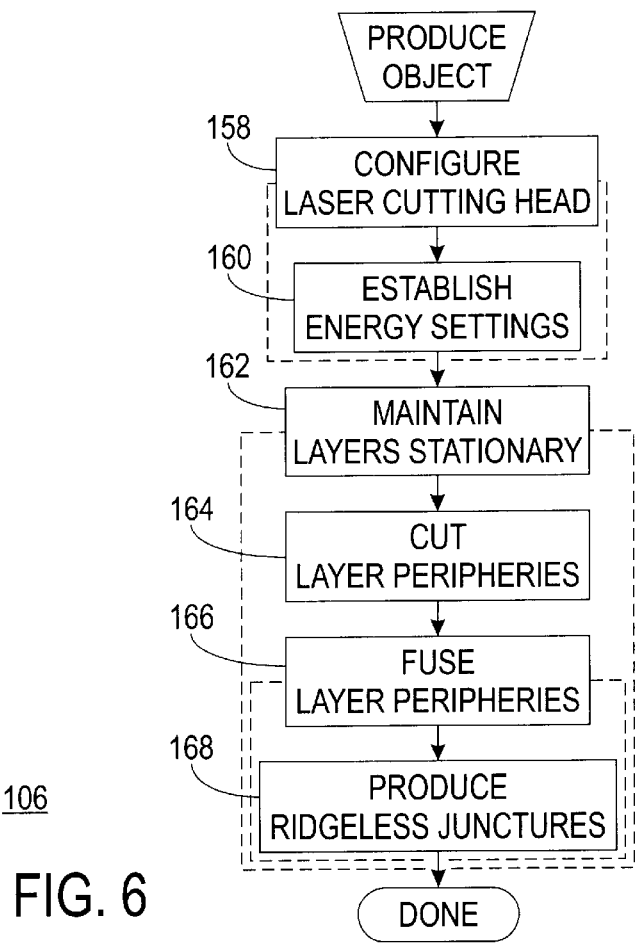
FIG. 6 depicts a flowchart of a subprocess of the process of FIG. 3 to produce the object of FIG. 1 in accordance with a preferred embodiment of the present invention.

In accordance with a preferred embodiment of the present invention, FIG. 1 depicts a cross-sectional view of a portion of a flexible object 20, FIG. 2 depicts a plan view of object 20, FIG. 3 depicts a flowchart of a process 100 to construct object 20, FIG. 4 depicts a flowchart of a subprocess 102 of process 100 to obtain layers 22 of flexible sheet material for object 20, FIG. 5 depicts a flowchart of a subprocess 104 of process 100 to position layers 22 for object 20, and FIG. 6 depicts a flowchart of a subprocess 106 of process 100 to produce object 20.

Flexible object 20 is made up of a plurality of layers 22 of a fusible sheet material, typically woven polyester. Layers 22 are coincidentally cut and fused to form object 20. In an overview of process 100 (FIG. 3), to construct object 20, subprocess 102 obtains layers 22, subprocess 104 positions layers 22 upon a bed or work surface 24 of a numerical-control laser cutting machine (laser NC machine) (not shown), subprocess 106 produces object 20 by cutting and fusing layers 22 with a laser cutting head 26 of the laser NC machine, and a task 108 extracts object 20 from the laser NC machine.

In the preferred embodiment of FIG. 1, object 20 is made up of six layers 22 of polyester sheet material woven from twisted microfibers, i.e., fibers of less than one denier (grams per 9000 meters). Typical of such sheet materials is DACRON® Polyester Fiber/Staple Number DAP000001, manufactured by DuPont-Akra Polyester, LLC. Six layers 22 have been found to substantially reduce the risk of penetration by needles of a surgical-glove pad. In other embodiments (not shown), it may be desirable to provide differing numbers of layers 22 of differing materials of differing fabrications to suit specific requirements. For example, an object 20 having nine layers 22 of substantially the same woven polyester sheet material has been found to be preferred for use as pads for examination gloves of the type used by police and fire personnel.

In process 100, subprocess 102 (FIG. 4) obtains layers 22. Layers 22 include a first outer layer 28 of object 20. Obtain first layer hypertask (i.e., a task of tasks) 110 within subprocess 102 obtains first outer layer 28. First outer layer 28 possesses an outer surface 30 and an inner surface 32, where outer surface 30 will ultimately become a first surface 34 of object 20.

Because outer-surface 30 of first outer layer 28 will ultimately become first object surface 34, outer surface 30 may be coated, e.g., have an adhesive or other coating applied thereto. First outer layer 28 may be supplied precoated or may be coated as a part of process 100.

A query task 112 within hypertask 110 determines if a precoated first outer layer 28 is to be provided. If query task 112 determines that a precoated first outer layer 28 is desired, then hypertask 110 uses a task 114 to obtain the desired precoated first outer layer 28. Hypertask 110 is then complete.

If query task 112 determines that a precoated first outer layer 28 is not desired, then hypertask 110 uses a task 116 to obtain an uncoated first outer layer 28.

A query task 118 then determines if outer surface 30 is to be coated. If query task 118 determines that outer surface 30 is not to be coated, then hypertask 110 is complete.

If query task 118 determines that outer surface 30 is to be coated, then in a task 120 coating 46 is applied to outer surface 30.

If coating 46 is an adhesive coating 46, potential problems arise. These problems are misadhesion of first outer layer 28 (i.e., layer 28 sticks to the wrong surface or in the wrong position and/or orientation) and contamination of coating 46. Both of these problems may be addressed by having an ancillary layer 48 affixed to first outer layer 28 via coating 46. Ancillary layer 48 is typically a paper or plastic adhesive-release layer that protects coating 46 until required, at which time ancillary layer 48 is removed (i.e., peeled off) leaving object 20 free to be adhered as desired. Other aspects of ancillary layer 48 are discussed in hereinafter.

In an optional task 122, ancillary layer 48 is affixed to first outer layer 28 to protect coating 46. Hypertask 100 is then complete.

With the completion of hypertask 110, the desired form of first outer layer 28 has been obtained. In the embodiment of FIG. 1, first outer layer 28 is depicted as having adhesive coating 46 with ancillary layer 48 affixed thereto. Therefore, hypertask 110, in support of FIG. 1, executes either tasks 112 and 114 if first outer layer 28 is precoated, or tasks 112, 116, 118, 120, and 122 if first outer layer 28 is not precoated.

Layers 22 may include intermediate layers 36 of object 20. Obtain intermediate layers hypertask 124 within subprocess 102 obtains intermediate layers 36, if any. A query task 126 within hypertask 124 determines if object 20 has at least one intermediate layer 36. If yes, hypertask 100 uses a task 128 to obtain the requisite number of intermediate layers 36. If no, hypertask 124 bypasses task 128 and no intermediate layers are obtained. In the embodiment of FIG. 1, object 20 is depicted as having four intermediate layers 36. Therefore, hypertask 124, in support of FIG. 1, executes tasks 126 and 128, and task 128 obtains four intermediate layers 36.

Layers 22 include a second outer layer 38 of object 20. Obtain second layer hypertask 130 within subprocess 102 obtains second outer layer 38. Second outer layer 38 possesses an outer surface 40 and an inner surface 42, where outer surface 40 will ultimately become a second surface 44 of object 20.

Because outer-surface 40 of second outer layer 38 will ultimately become second object surface 44, outer surface 40 may be coated. Second outer layer 38 may be supplied precoated or may be coated as a part of process 100.

A query task 132 within hypertask 130 determines if a precoated second outer layer 28 is to be provided. If query task 132 determines that a precoated second outer layer 38 is desired, then hypertask 130 uses a task 134 to obtain the desired precoated second outer layer 38. Hypertask 130 is then complete.

If query task 132 determines that a precoated second outer layer 38 is not desired, then hypertask 130 uses a task 136 to obtain an uncoated second outer layer 38.

A query task 138 then determines if outer surface 40 is to be coated. If query task 138 determines that outer surface 40 is not to be coated, then hypertask 130 is complete.

If query task 138 determines that outer surface 40 is to be coated, then in a task 140 coating 46 is applied to outer surface 40.

In an optional task 142, ancillary layer 48 is affixed to second outer layer 38 to protect coating 46. Hypertask 130 is then complete.

With the completion of hypertask 130, the desired form of second outer layer 28 has been obtained. In the embodiment of FIG. 1, second outer layer 38 is depicted as having no coating 46 or ancillary layer 48. Therefore, hypertask 130, in support of FIG. 1 but exclusive of other coating arrangements discussed hereinafter, executes tasks 132, 136, and 138.

Subprocess 102 is now complete and control returns to process 100 (FIG. 3). Those skilled in the art will appreciate that the scenario discussed hereinbefore for subprocess 102 presents only one of a plurality of possible scenarios for obtaining layers 22 of object 20. The use of another scenario does not depart from the spirit of the present invention.

Following subprocess 102, process 100 (FIG. 3) executes subprocess 104 (FIG. 5) to position layers 22 on work surface 24 of the laser NC machine (not shown). Assuming, for the sake of this discussion only, that layers 22 are positioned above work surface 24, then towards work surface 24 is "down" and away from work surface 24 is "up". In a task 144, first outer layer 28 is positioned over or upon work surface 24 with outer surface 30 down. If outer surface 30 has coating 46, then first outer layer 28 is positioned coated-side down. If first outer layer 28 has an ancillary layer 48 to protect coating 46, then first outer layer 28 is positioned with ancillary layer 48 down.

Following task 144, a query task 146 determines if object 20 has at least one intermediate layer 36. If yes, then in a task 148 one intermediate layer 36 is positioned over first outer layer 28. Control then passes back to query task 146.

Query task 146 then determines if there is at least one remaining (i.e., unpositioned) intermediate layer 36 for object 20. If yes, then in task 148 that one layer is positioned over the last-positioned intermediate layer 36 (i.e., over first outer layer 28), and control is again passed back to query task 146.

When query task 146 determines that there are no or no more intermediate layers 36 for object 20, control passes to a task 150. In task 150, second outer layer 38 is positioned over first outer layer 28 (i.e., over the last-positioned intermediate layer 36 if object 20 has at least one intermediate layer 36) with outer surface 40 up, i.e., so that inner surfaces 32 and 42 of first and second outer layers 28 and 38, respectively, are in opposition. If outer surface 40 has coating 46, then second outer layer 38 is positioned coated-side up. If second outer layer 38 has an ancillary layer 48 to protect coating 46, then second outer layer 38 is positioned with ancillary layer 48 up.

If desired for object 20 to have a coated outer surface and neither first outer layer 28 nor second outer layer 38 has been precoated or coated as a function of subprocess 102, then an optional query task 152 may be used to determine if outer surface 40 of second outer layer 38, i.e., second object surface 44, is to be coated.

If optional query task 152 is not employed or has determined that second object surface 44 is not to be coated, then subprocess 104 is complete and control returns to process 100 (FIG. 3).

If option query task 152 is employed and has determined that second object surface 44 is to be coated, then in a task 154 coating 46 is applied to outer surface 40 of second outer layer 38. In an optional task 156, ancillary layer 48 is then positioned over second outer layer 38 to protect coating 46. Subprocess 104 is now complete and control returns to process 100 (FIG. 3).

At this time, all layers 22 of object 20 are positioned over work surface 24 preparatory to the production of object 20 itself. Those skilled in the art will appreciate that the scenario discussed hereinbefore for subprocess 104 presents only one of a plurality of possible scenarios for positioning layers 22 of object 20. The use of another scenario does not depart from the spirit of the present invention.

Following subprocess 104, process 100 (FIG. 3) executes subprocess 106 (FIG. 6) to produce object 20 from layers 22. In a task 158, laser cutting head 26 is configured be fusional for layers 22. That is, laser cutting head 26 is configured to not only cut layers 22 but to fuse the cut layers 22 into object 20. To accomplish this, the laser NC machine (not shown) moves laser cutting head 26 relative to positioned layers 22. That is, for some laser NC machines, laser cutting head 26 may be moved over stationary work surface 24 and layers 22 during the cutting and fusing activities (discussed hereinafter), while for other NC machines, work surface 24 and layers 22 may be moved under stationary laser cutting head 26.

In a subtask 160 within task 158 the energy and movement settings for laser cutting head 26 are established. For the preferred embodiment of object 20, i.e., six layers of woven polyester sheet material, the energy and movement settings for a Mitsubishi $CO_2$ laser NC machine, model 2512-LXP, are as depicted in Table 1, derived from experimental data.

TABLE 1

| | Power W | Frequency Hz | Duty Cycle % | Feed Rate cm/s | Focus μm | Gap μm |
|---|---|---|---|---|---|---|
| Pierce | 50 | 700 | 10 | 0 | −254 | 762 |
| Cut/Fuse 1 | 100 | 700 | 40 | 16.1 | −254 | 762 |
| Cut/Fuse 2 | 125 | 700 | 40 | 21.2 | −254 | 762 |

As may be seen from the data in Table 1, and allowing for variations in the number and composition of layers 22, laser cutting head 26 is set to approximately 2.5 watt-seconds per centimeter (±50 percent) to cut and fuse layers 22. Once laser cutting head 26 has been configured, it may be used, under the control of the laser NC machine (not shown) of which it is a part, to produce objects 20.

In a task 162 in subprocess 106, layers 22 are made and maintained stationary relative to each other for the duration of subprocess 106. That is, first outer layer 28, intermediate layers 36 (if any), second outer layer 38, and ancillary layers 48 (if any) are compressed, clamped, or otherwise made to remain unmoving relative to each other while object 20 is produced.

In a task 164 following the initiation of task 162, laser cutting head 26 substantially simultaneously cuts each layer 22 into a shape having a layer periphery 50 (FIG. 1) conforming to a desired periphery 52 (FIG. 2) of object 20. Since cutting task 164 is performed by a laser, there are no significant lateral forces applied to layers 22 during cutting task 164. Layers 22 are therefor not significantly positionally disturbed during cutting task 164.

Coincident with cutting task 164, a task 166 fuses layer peripheries 50 into a single object periphery 52. That is, in the preferred embodiment, each layer periphery 50 is fused (melted) into each other layer periphery 50 so that inner surface 32 of first outer layer 28 is coupled to inner surface 42 of second outer layer 38 through intermediate layers 36 (if any). This produces a fused region 54 (FIGS. 1 and 2) extending inward from object periphery 52. Desirably, fused region 54 extends inward only enough to mutually conjoin layers 22 in order to maintain flexibility of object periphery 52.

In the preferred and other embodiments employing woven microfiber polyester shell material for layers 22, the inward extension of fused region 54 desirably does not exceed two millimeters. In the preferred embodiment, the inward extension of fused region 54, while varying to some degree between different pairs of layers 22, is consistently less than 0.5 millimeters.

Laser cutting head 26 should be configured in task 158 to provide sufficient energy to perform cutting and fusing tasks 164 and 166, but insufficient energy to cause fused region 54 to boil, bubble, crystallize, or carbonize during fusing task 166. Boiling, bubbling, crystallizing, or carbonizing would significantly decrease the flexibility of fused region 54, i.e., of object periphery 52 and object 20 overall. This is especially true of carbonizing. Therefore, fusing task 166 should produce fused region 54 having a smooth and even texture with no visible discoloration. That is, the color of fused region 54 (i.e., of object periphery 52) should be substantially similar to the color of the unfused portions of the fusible sheet material making up outer layers 28 and 38.

If layers 22 include one or more ancillary layers 48, these layers 48 are treated somewhat differently than other layers 22. Ancillary layers 48 are formed of a non-fusible material, such as paper. Therefore, while cutting task 164 cuts ancillary layers 48 to produce layer peripheries 50 thereof, fusing task 166 does not fuse ancillary-layer peripheries 50 to other layer peripheries 50. Ancillary layers 48 remain distinct layers after fusing task 166. This allows ancillary layers 48 to cover and protect coating 46, yet be peeled off and expose coating 46 when required.

Within fusing task 166, a subtask 168 produces substantially ridgeless junctures 56 between first and second object surfaces 34 and 44. This is desirable as any ridges would interfere with the transmission of tactile sensation through object 20. By setting laser cutting head 26 to the appropriate energy settings, substantially ridgeless junctures 56 may be achieved.

Tasks 164 and 166, and subtask 168, are coincidental. That is, layer peripheries 50 are cut and fused in one single operation through the use of laser cutting head 26 of the laser NC machine (not shown) of which it is a part.

With the completion of subtask 168, subprocess 106 is complete and control returns to process 100 (FIG. 3). Those skilled in the art will appreciate that the details discussed herein in conjunction with subprocess 106 may be varied without departing from the spirit of the present invention.

Following subprocess 106, process 100 executes task 108 to extract objects 20 from the laser NC machine and from any scrap material surrounding object 20. Task 108 may be manually or automatically implemented.

While this discussion of process 100 concerns itself with the construction of a single object 100, those skilled in the art will appreciate that a plurality or multiplicity of objects 20 may be constructed substantially simultaneously or repetitively from the same layers 22 of fusible material.

In summary, the present invention teaches a process 100 of manufacturing a coincidentally cut and fused object 20, and object 20 thereby produced, by coincidentally cutting 164 and fusing 166 a plurality of substantially identical layers 22 of a fusible woven polyester sheet material with a laser cutting head 26 on a laser NC machine (not shown). The cutting 164 and fusing 166 activities provide a flexible periphery 52 for object 20 while producing 168 substantially ridgeless junctures 56 between surfaces 34 and 44 of object 20 and flexible object periphery 52. It is another advantage of the invention that a surface of the object may have an adhesive coating.

Those skilled in the art will appreciate that the present invention is method 100 of manufacturing object 20, and object 20 itself, without regard to the function of object 20. Therefore, the use of method 100 to produce objects 20 of differing functionality, e.g., penetration-resistant padding for surgical and/or examination gloves, flak-jacket padding, thermal padding, quilting, load and tow straps, etc., does not depart from the spirit of the present invention. Although a preferred embodiment of the present invention has been illustrated and described in detail, it will be readily apparent to those skilled in the art that various modifications may be made therein without departing from the spirit of the invention or from the scope of the appended claims.

What is claimed is:

1. A method of constructing a flexible object formed of a plurality of mutually conjoined layers, said method comprising:

a) positioning a first layer of a woven fusible sheet material over a work surface, wherein an outer surface of said first layer comprises a first surface of said flexible object;

b) positioning a second layer of a woven fusible sheet material over said first layer, wherein an outer surface of said second layer comprises a second surface of said flexible object;

c) cutting a layer periphery of each of said first and second layers by moving said first and second layers relative to a laser cutting head;

d) fusing, coincidentally with said cutting activity c), said layer peripheries with said laser cutting head to form an object periphery, wherein said fusing activity d) produces a substantially ridgeless juncture between said object periphery and one of said first and second surfaces; and e) maintaining said first and second layers stationary relative to each other during said coincident cutting and fusing activities.

2. A flexible-object construction method as claimed in claim 1 additionally comprising:
   positioning an intermediate layer between said first and second layers; and
   configuring said laser cutting head to be fusional for said first, second, and intermediate layers.

3. A flexible-object construction method as claimed in claim 1 wherein said positioning activities a) and b) position said first and second layers of substantially identical woven fusible sheet materials.

4. A flexible-object construction method as claimed in claim 1 additionally comprising positioning f) at least one intermediate layer of a woven fusible sheet material between said first and second layers.

5. A flexible-object construction method as claimed in claim 4 wherein said positioning activities a), b), and f) position substantially identical layers of woven polyester microfiber material.

6. A flexible-object construction method as claimed in claim 1 additionally comprising coating an outer surface of one of said first and second layers with an adhesive coating.

7. A flexible-object construction method as claimed in claim 1, wherein:
   said method additionally comprises obtaining a first layer of substantially a fusible sheet material of woven polyester;
   said positioning activity a) positions said first layer over said work surface;
   said method additionally comprises obtaining a second layer of said material;
   said positioning activity b) positions said second layer over said first layer;
   said method additionally comprises obtaining four intermediate layers of said material;
   said method additionally comprises positioning said intermediate layers between said first and second layers;
   said method additionally comprises configuring a laser cutting head to be fusional for all of said layers;
   said cutting activity c) cuts a layer periphery of each of said layers; and
   said fusing activity d) fuses said layer peripheries of each of said layers into said object periphery with said laser cutting head.

8. A flexible-object construction method as claimed in claim 1 wherein said first and second layers are formed of woven polyester microfibers so as to reduce a risk of penetration of said flexible object.

9. A method of constructing a flexible object formed of a plurality of mutually conjoined layers, said method comprising:
   positioning a first layer of a fusible sheet material over a work surface;
   positioning a second layer of a fusible sheet material over said first layer;
   cutting a layer periphery of said object through each of said first and second layers by moving said first and second layers relative to a laser cutting head;
   fusing, coincidentally with said cutting activity, said layer peripheries with said laser cutting head to form an object periphery;
   producing, during said fusing activity, a substantially ridgeless juncture between said object periphery and an outer surface of one of said first and second layers so that said object periphery is flexible; and
   maintaining said first and second layers stationary relative to each other during said cutting, fusing, and producing activities.

10. A method of constructing a flexible object formed of a plurality of mutually conjoined layers, said method comprising:
   obtaining a first layer of substantially a fusible sheet material of woven polyester;
   positioning said first layer over a work surface;
   obtaining a second layer of said material;
   positioning said second layer over said first layer;
   obtaining four intermediate layers of said material;
   positioning said intermediate layers between said first and second layers;
   configuring a laser cutting head to be fusional for all of said layers by establishing an energy setting of said laser cutting head of 2.5 watt-seconds per centimeter, ±50 percent;
   cutting a periphery of said object through each of said layers by substantially simultaneously moving said laser cutting head relative to said layers; and
   fusing, coincidentally with said cutting activity, said peripheries of said layers with said laser cutting head.

* * * * *